(12) United States Patent
Perlman et al.

(10) Patent No.: US 10,284,534 B1
(45) Date of Patent: May 7, 2019

(54) STORAGE SYSTEM WITH CONTROLLER KEY WRAPPING OF DATA ENCRYPTION KEY IN METADATA OF STORED DATA ITEM

(71) Applicant: EMC Corporation, Hopkinton, MA (US)

(72) Inventors: Radia Perlman, Redmond, WA (US); Xuan Tang, Hopkinton, MA (US); Greg Lazar, Upton, MA (US); Thomas Dibb, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 377 days.

(21) Appl. No.: 14/752,106

(22) Filed: Jun. 26, 2015

(51) Int. Cl.
    *H04L 29/06*     (2006.01)
    *H04L 9/32*     (2006.01)

(52) U.S. Cl.
    CPC .......... *H04L 63/061* (2013.01); *H04L 9/3242* (2013.01); *H04L 63/0464* (2013.01); *H04L 63/064* (2013.01)

(58) Field of Classification Search
    CPC .................................................... H04L 63/061
    See application file for complete search history.

(56) References Cited

U.S. PATENT DOCUMENTS

| | | |
|---|---|---|
| 6,577,734 B1 | 6/2003 | Etzel et al. |
| 7,814,318 B1 | 10/2010 | Perlman et al. |
| 8,650,657 B1 | 2/2014 | Shankar et al. |
| 8,832,466 B1 | 9/2014 | McGregor, Jr. et al. |
| 9,064,135 B1 * | 6/2015 | Poo .......................... G06F 21/72 |
| 9,659,190 B1 * | 5/2017 | Perlman .................. G06F 21/78 |
| 9,779,269 B1 | 10/2017 | Perlman |
| 9,906,361 B1 | 2/2018 | Perlman et al. |
| 2003/0002668 A1 | 1/2003 | Graunke et al. |
| 2005/0018853 A1 | 1/2005 | Lain et al. |
| 2006/0282666 A1 | 12/2006 | Kim |

(Continued)

FOREIGN PATENT DOCUMENTS

EP     1414181 A1     4/2004

OTHER PUBLICATIONS

Radia Perlman, "File System Design with Assured Delete," 14th Annual Network and Distributed System Security Symposium (NDSS), Feb.-Mar. 2007, 13 pages.

*Primary Examiner* — John B King
(74) *Attorney, Agent, or Firm* — Ryan, Mason & Lewis, LLP (57) ABSTRACT

An apparatus comprises a storage system, a key manager incorporated in or otherwise associated with the storage system, and an input-output controller coupled to the key manager and configured to control storage of data items in the storage system. The key manager is configured to determine a controller key accessible to the input-output controller and a plurality of data encryption keys utilizable by the input-output controller to encrypt the data items for storage in the storage system. A given one of the data items is encrypted using a particular one of the data encryption keys and has associated metadata that includes the particular data encryption key encrypted using the controller key. The metadata may comprise an inner wrapping of the particular data encryption key using the controller key and at least one outer wrapping of the inner wrapping using at least one additional key.

21 Claims, 2 Drawing Sheets

(56) References Cited

U.S. PATENT DOCUMENTS

| | | |
|---|---|---|
| 2006/0288232 A1 | 12/2006 | Ho et al. |
| 2007/0226809 A1 | 9/2007 | Ellard |
| 2007/0245410 A1 | 10/2007 | Perlman et al. |
| 2008/0212770 A1* | 9/2008 | Satou .................. H04L 9/0637 380/44 |
| 2009/0110191 A1 | 4/2009 | Sanvido et al. |
| 2011/0158405 A1 | 6/2011 | Choi et al. |
| 2011/0225428 A1* | 9/2011 | Stufflebeam, Jr. ...... G06F 21/72 713/189 |
| 2011/0252232 A1* | 10/2011 | De Atley .......... G06F 17/30117 713/165 |
| 2011/0283113 A1 | 11/2011 | Moffat et al. |
| 2012/0284528 A1 | 11/2012 | Orovitz |
| 2013/0305057 A1 | 11/2013 | Greco et al. |
| 2013/0322621 A1 | 12/2013 | Yoon et al. |
| 2014/0006802 A1* | 1/2014 | Cachin .................. H04L 9/0861 713/189 |
| 2014/0025963 A1 | 1/2014 | Subramanian |
| 2014/0068257 A1 | 3/2014 | Burckard |
| 2014/0143543 A1* | 5/2014 | Aikas ................. H04L 67/1097 713/168 |
| 2014/0351605 A1 | 11/2014 | De Atley et al. |
| 2014/0359309 A1 | 12/2014 | Cachin et al. |
| 2015/0019870 A1 | 1/2015 | Patnala et al. |
| 2017/0118180 A1* | 4/2017 | Takahashi ................. H04L 9/14 |

\* cited by examiner

FIG. 1

STORAGE SYSTEM WITH CONTROLLER KEY WRAPPING OF DATA ENCRYPTION KEY IN METADATA OF STORED DATA ITEM

FIELD

The field relates generally to storage systems, and more particularly to storage systems that utilize data encryption.

BACKGROUND

In many storage systems, data is stored under encryption utilizing one or more cryptographic keys, which are more generally referred to herein as "master keys." However, problems can arise in such systems in regard to "shredding" of stored encrypted data items, where shredding generally refers to effectively rendering unreadable or otherwise deleting a given stored encrypted data item through deletion of its associated master key. More particularly, shredding of stored encrypted data items under conventional practice can be unduly complex, in that it typically involves decryption of all data items to be retained followed by corresponding re-encryption of the retained data items using a new master key. This can significantly undermine the performance of the storage system, particularly for systems that store large amounts of data or are subject to frequent deletion of data items.

SUMMARY

Illustrative embodiments of the invention provide storage systems that implement controller key wrapping of data encryption keys in metadata of respective stored encrypted data items.

In one embodiment, an apparatus comprises a storage system, a key manager incorporated in or otherwise associated with the storage system, and an input-output controller coupled to the key manager and configured to control storage of data items in the storage system. The key manager is configured to determine a controller key accessible to the input-output controller and a plurality of data encryption keys utilizable by the input-output controller to encrypt the data items for storage in the storage system. A given one of the data items is encrypted using a particular one of the data encryption keys. The given data item has associated metadata that includes the particular data encryption key encrypted using the controller key.

The metadata associated with the given data item advantageously allows the input-output controller to read or write the data item in the storage system using the controller key accessible to the input-output controller and the data encryption key contained within that metadata, and therefore without requiring that the input-output controller communicate with the key manager in conjunction with the particular read or write of the data item. This substantially reduces the number of communications required between the input-output controller and the key manager. As a result, latency associated with reading and writing of data items is reduced and system performance is improved.

The metadata associated with the given data item in some embodiments illustratively comprises an inner wrapping of the particular data encryption key and at least one outer wrapping of the inner wrapping, with the inner wrapping using the controller key and the outer wrapping(s) using at least one additional key.

For example, the storage system may be configured to store data items across a plurality of dimensions with each such dimension comprising a plurality of classes, with class keys being assigned to respective ones of the classes of each of the dimensions. The data encryption key used to encrypt the given data item in such an embodiment may comprise a multidimensional key determined as a function of the class keys corresponding to respective ones of the classes with which that data item is associated.

Additionally or alternatively, the class keys may be used as respective ones of the above-noted additional keys to provide outer wrappings of a data encryption key that has an inner wrapping using the controller key. A wrapped data encryption key of this type may also be viewed as a type of multidimensional key as that term is used herein.

Arrangements involving multidimensional keys in some embodiments advantageously allow all of the data items associated with a given one of the classes to be deleted by deleting the class key assigned to the given class. This type of efficient shredding process can provide substantial performance improvements in storage systems that store large amounts of data or are subject to frequent deletion of data items.

These and other embodiments include, without limitation, systems, apparatus, methods and processor-readable storage media.

DETAILED DESCRIPTION

Illustrative embodiments of the present invention will be described herein with reference to exemplary storage systems and associated processing devices. It is to be appreciated, however, that embodiments of the invention are not restricted to use with the particular illustrative system and device configurations shown. Accordingly, the term "storage system" as used herein is intended to be broadly construed, so as to encompass, for example, storage systems comprising storage arrays or other types and arrangements of storage products as well as cloud storage systems comprising virtual infrastructure.

Figure 1:
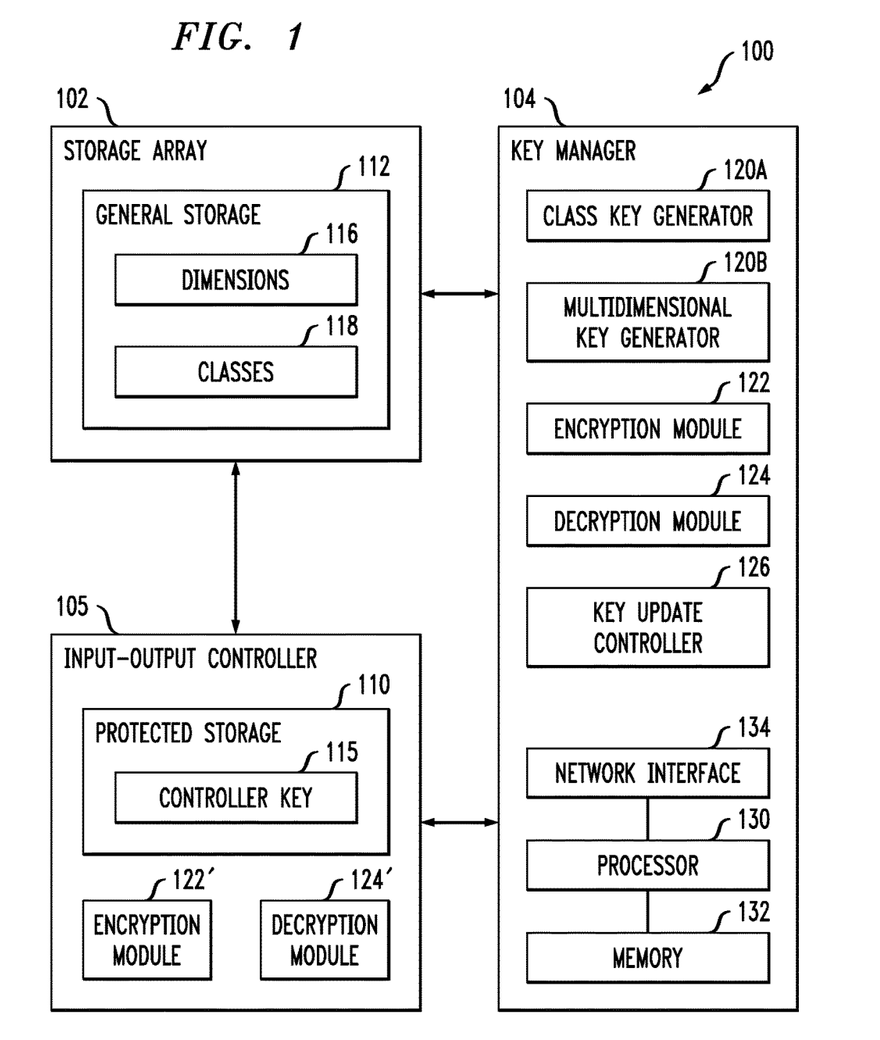
FIG. 1 is a block diagram of a storage system configured for controller key wrapping of data encryption keys in metadata of respective stored encrypted data items in an illustrative embodiment of the invention.

FIG. 1 shows a storage system 100 configured in accordance with an illustrative embodiment of the present invention. The storage system 100 comprises a storage array 102 coupled to a key manager 104. Also coupled to the storage array 102 and the key manager 104 is an input-output controller 105. The input-output controller 105 is configured to control storage of data items in the storage array 102.

Although the key manager 104 and input-output controller 105 are shown as being separate from the storage array 102 in this embodiment, in other embodiments at least one of the key manager 104 and the input-output controller 105 may be at least partially incorporated into the storage array 102. Such an arrangement of a storage array comprising at least one of an internal key manager and an internal input-output controller is considered an example of a "storage system" as that term is broadly utilized herein.

It is also possible that the key manager 104 can be implemented at least in part within the input-output controller 105, or that the input-output controller 105 can be implemented at least in part within the key manager 104. Such arrangements are considered alternative couplings of the key manager and input-output controller elements of the system 100.

The input-output controller 105 illustratively comprises protected storage 110. In other embodiments, at least portions of the protected storage 110 can be implemented in the storage array 102 or in the key manager 104. For example, in some embodiments the storage array 102 can comprise both protected storage and general storage, or other arrangements of multiple distinct types of storage.

The storage array 102 comprises general storage 112. The protected storage 110 and the general storage 112 are examples of what are more generally referred to herein as respective first and second storage of the storage system. Such first storage is of a first type and second storage is of a second type, with the first storage providing enhanced data protection relative to the second storage. For example, in the present embodiment, it is assumed that data items are stored in encrypted form in the general storage 112, but that the protected storage 110 provides enhanced data protection relative to that provided by encrypted storage in the general storage 112.

The protected storage 110 may therefore be part of a trusted platform module or other highly secure module that provides the highest level of data protection available in the storage system 100. Additionally or alternatively, the protected storage 110 may provide stronger encryption than that provided for data items stored in the general storage 112. This stronger encryption may involve, for example, use of multiple encryption layers or other cryptographic techniques familiar to those skilled in the art.

In some embodiments, at least a portion of the protected storage 110 may comprise a secure database of the key manager 104. An embodiment of this type may be considered an example of an arrangement in which a portion of the protected storage 110 is incorporated within the key manager 104 or an associated key manager database.

As maintenance of the protected storage 110 can be complex in some embodiments, it is often desirable to minimize the amount of information that must be stored there. The encrypted stored data items in the general storage 112 are not subject to the same restrictions, and in some embodiments can even be replicated widely.

The protected storage 110 stores at least one controller key 115 that is utilized in "wrapping" or otherwise encrypting data encryption keys that are utilized to encrypt data items for storage in the general storage 112 of the storage array 102. The protected storage 110 can also be utilized to store class keys or multidimensional keys in some embodiments.

Data encryption keys as that term is broadly used herein may comprise, for example, master keys, multidimensional keys or other types of keys used to encrypt data items for storage in the general storage 112 of the storage array 102.

As indicated above, the input-output controller 105 comprising protected storage 110 may comprise a trusted platform module or other highly secure module within the storage system 100. In other embodiments, as indicated previously, at least portions of the protected storage 110 of the input-output controller 105 can be replaced with corresponding components of the storage array 102 or the key manager 104.

In some embodiments, the input-output controller 105 is implemented as an integrated circuit or other type of secure hardware module, possibly utilizing disk adaptor serial link hardware or other similar hardware.

The key manager 104 and the input-output controller 105 may each be implemented as dedicated and protected system components that are possibly FIPS-certified, where FIPS denotes Federal Information Processing Standards, such as FIPS 140-1 and 140-2 relating to security of cryptographic modules.

The key manager 104 and the input-output controller 105 in some embodiments are configured to communicate with one another in accordance with Key Management Interoperability Protocol (KMIP), although other protocols can be used.

The key manager 104 is configured to determine at least one controller key 115 accessible to the input-output controller 105 and a plurality of data encryption keys utilizable by the input-output controller 105 to encrypt the data items for storage in the general storage 112 of the storage array 102.

A given one of the data items is encrypted using a particular one of the data encryption keys. The given data item has associated metadata that includes the particular data encryption key encrypted using the controller key. Such encryption of the data encryption key utilizing the controller key in some embodiments is referred to as "wrapping" of the data encryption key with the controller key.

Other data items are similarly encrypted for storage in general storage 112 utilizing corresponding data encryption keys. For example, each data item can be encrypted using a unique data encryption key, or the same data encryption key can be used to encrypt each data item in a group of data items.

The metadata associated with the given data item advantageously allows the input-output controller 105 to read or write the data item in the general storage 112 using the controller key 115 accessible to the input-output controller 105 and the data encryption key contained within that metadata, and therefore without requiring that the input-output controller 105 communicate with the key manager 104 in conjunction with the particular read or write of the data item. This substantially reduces the number of communications required between the input-output controller 105 and the key manager 104 and thereby reduces read and write latency and improves performance in the storage system 100.

In addition, security of the data encryption keys is improved within the storage system 100 as the data encryption keys are not exposed in unencrypted form to any software components of the storage array 102. This avoids situations in which data encryption keys could be improperly disclosed through a compromised operating system, inopportune memory dump or other issue relating to the storage array software.

The input-output controller 105 in these and other embodiments can be configured to control all reading and writing of data items in the storage array 102. All such data items are assumed to have associated metadata that includes the corresponding data encryption key wrapped using a controller key of the input-output controller 105.

For example, assume that the controller key is a key denoted S. Typically, both the key manager 104 and the input-output controller 105 know the controller key S. Further assume that the data encryption key for a given data item is denoted K. The metadata for the given data item includes the data encryption key K wrapped with the controller key S, with such wrapping being denoted {K}S.

The key manager 104 is illustratively involved in generating the metadata comprising the data encryption key K for the given data item. For example, the key manager can generate the key K as a random number, encrypt K by wrapping it with S, and then provide the result for storage as the metadata for the data item. The generation of the key K and wrapping of K to create {K}S can be performed by the key manager responsive to creation of the corresponding data item within the system, responsive to a request for a wrapped key for the data item, or under other specified conditions.

In order to read or write the encrypted stored data item, the input-output controller 105 obtains {K}S from the metadata for that data item, and unwraps K using the controller key S to obtain K, which it can then use to decrypt the data item. For example, relatively untrusted software of the storage array 102 can copy {K}S from the data item metadata in order to make {K}S available to the input-output controller 105.

As indicated above, incorporating the data encryption key in the metadata of the data item that is encrypted for storage using that data encryption key avoids the need for the input-output controller 105 to contact the key manager 104 to obtain that data encryption key in conjunction with reading or writing the stored encrypted data item. This alleviates potential bottlenecks involving communication with the key manager. Also, a key manager database need not contain all of the data encryption keys. The corresponding reduction in the size of the key manager database can help to reduce system cost and complexity.

In some embodiments, the metadata associated with the given data item illustratively comprises an inner wrapping of the particular data encryption key and at least one outer wrapping of the inner wrapping, with the inner wrapping using the controller key and at least one outer wrapping using at least one additional key. For example, the outer wrapping(s) can comprise a plurality of outer wrappings formed by sequentially wrapping the inner wrapping using respective ones of a plurality of class keys corresponding to respective ones of a plurality of classes with which the given data item is associated. Association of data items with multiple classes of respective dimensions will be described in more detail below.

The use of outer wrappings may eliminate some of the advantage of reduced communications between the input-output controller 105 and the key manager 104. However, the safety advantages are maintained, and there is still no need for the input-output controller 105 to communicate with the key manager 104 with regard to the inner wrapping of the data encryption key using the controller key.

The key manager 104 in cooperation with the input-output controller 105 can update the controller key 115 by decrypting the data encryption key in the metadata of each data item using the controller key, deleting the controller key, obtaining a replacement controller key and re-encrypting the data encryption key in the metadata of each data item using the replacement controller key. This advantageously avoids the need to "roll over" the encrypted stored data items in general storage 112 by decrypting and re-encrypting those data items in conjunction with an update of the controller key.

Accordingly, updating the controller key 115 in the present embodiment is implemented through alteration of the metadata containing the wrapped data encryption keys. The data encryption keys themselves and the corresponding data items need not be altered.

At least a subset of the controller key 115 and the data encryption keys may be part of a key hierarchy. For example, the key manager 104 in some embodiments may be configured to maintain a key hierarchy for the storage system 100, with the key hierarchy comprising a plurality of levels. An uppermost level of the key hierarchy may comprise the controller key 115 and a lowermost level of the key hierarchy may comprise at least a subset of the data encryption keys. Each of the data encryption keys of the lowermost level of the key hierarchy may be associated with a different group of the data items and utilized to encrypt the data items of that group for storage in the general storage 112.

The use of a key hierarchy of this type advantageously facilitates shredding of data items in particular selected ones of the groups. For example, data items within a given one of the groups can be shredded without the need to "roll over" any of the data items in any other ones of the groups.

In an arrangement of this type, keys of the key hierarchy other than the controller key 115 at the uppermost level of the key hierarchy can each be stored in general storage 112 under encryption by the controller key and one or more other keys of the key hierarchy. The key hierarchy in some embodiments may be in the form of a "master key hierarchy." Other embodiments need not utilize any type of key hierarchy.

The storage array 102 in the present embodiment is further assumed to store data items in encrypted form in general storage 112 across a plurality of dimensions 116 with each such dimension comprising a plurality of classes 118. It is to be appreciated, however, that other embodiments can be implemented that do not utilize storage of data items across dimensions and classes.

The dimensions 116 in some embodiments can be viewed as being "orthogonal" to one another, in that each of the classes 118 only appears in one of the dimensions 116. Thus, the dimensions in such an embodiment illustratively comprise disjoint subsets of the classes 118. As a result, data items in one class in a given dimension can be easily shredded regardless of the other classes that may be associated with those data items in other dimensions. Other arrangements of dimensions and classes can be used in other embodiments.

The key manager 104 is configured to assign class keys to respective ones of the classes 118 of each of the dimensions 116. The dimensions may illustratively comprise one or more of storage drive, customer and security level.

More particularly, an arrangement with all three of these example dimensions may more particularly include j classes within the storage drive dimension, k classes within the customer dimension, and n classes within the security level dimension, such that there is a total of j+k+n class keys. For example, if there are 2000 storage drives in the storage array 102, there would be 2000 class keys in the storage drive dimension, one for each storage drive. Similarly, if there are 100000 customers, there would be 100000 class keys in the customer dimension, one for each customer, and if there are 7 security levels, there would be 7 class keys in the security level dimension. Assume for purposes of further description below that the storage devices in this example are denoted D1, D2, . . . D2000, that the customers are denoted C1, C2, . . . C100000 and that the security levels are denoted S1, S2, . . . S7.

A given one of the data items associated with at least one of the classes in each of two or more of the dimensions is encrypted for storage in the storage array 102 using a multidimensional key determined as a function of the class keys corresponding to respective ones of the classes with which that data item is associated. The multidimensional key in some embodiments comprises a data encryption key prior to wrapping. In other embodiments, a wrapped data encryption key may be viewed as a type of multidimensional key.

The phrase "determined as a function of the class keys" in this context and elsewhere herein with reference to a multidimensional key is intended to be broadly construed so as to encompass, for example, arrangements in which a multidimensional key is generated from its associated class keys as well as arrangements in which a multidimensional key is decrypted or unwrapped using its associated class keys.

Returning to the above example having storage drive, customer and security level dimensions, assume that a particular data item is stored on drive D2 for customer C12 at security level L3. The corresponding multidimensional key utilized to encrypt that data item for storage in general storage 112 is determined as a function of keys KD2, KC12 and KL3 which denote the respective class keys for classes D2, C12 and L3.

In some embodiments, the multidimensional key used to encrypt the given data item comprises a cryptographic hash of the class keys corresponding to respective ones of the classes with which that data item is associated, although numerous other techniques can be used to generate a given multidimensional key from its associated class keys. As another example, the multidimensional key can be generated through application of a sequential wrapping process to a random number with each iteration of the sequential wrapping process using a different one of the associated class keys.

As will be described in more detail below, such an arrangement advantageously allows all of the data items associated with a given one of the classes to be deleted by deleting the class key assigned to the given class, without requiring decryption and re-encryption of any encrypted stored data items in any other ones of the classes.

Thus, with reference to the above-noted example arrangement, all of the data items on a particular storage drive, or of a particular customer, or at a particular security level, and various combinations thereof, can be efficiently deleted from the storage system by deletion of the corresponding class keys. For example, all data items associated with the highest security level L7 can be deleted from the storage system 100 by deleting the corresponding class key KL7. Such class-based deletion is readily scalable to larger numbers of dimensions, as the total number of class keys required for a given implementation is substantially linear in the number of dimensions and the number of classes per dimension.

Additionally or alternatively, selected ones of the encrypted data items can be provided to a recipient along with a subset of the class keys selected to limit readability of the encrypted data items to only those of the encrypted data items that are associated with the provided subset of the class keys and thereby authorized to be read by the recipient. Such an arrangement can be used to effectively "redact" data from a set of data items that are forwarded to a recipient, such as personally identifiable information (PII) or company confidential information that the recipient is not authorized to access. It should be noted that the term "recipient" in this context is intended to be broadly construed, and may encompass a user device or administrator terminal, or other type of automated recipient.

The above-described example storage arrangement based on encryption of data items using multidimensional keys determined as a function of class keys in some implementations bounds the total number of assigned class keys by a sum of the total numbers of classes in respective ones of the plurality of dimensions.

In some embodiments, a multidimensional key may comprise a type of data encryption key. Alternatively, a multidimensional key may comprise a wrapped data encryption key, such as a data encryption key with multiple outer wrappings using respective class keys. Accordingly, the term "multidimensional key" as used herein is intended to be broadly construed, and in different embodiments may encompass either a wrapped or unwrapped data encryption key. Other embodiments can utilize other types of data encryption keys not involving class keys or multidimensional keys.

In a given embodiment utilizing multidimensional keys determined as a function of class keys, it is possible that at least one of the dimensions 116 includes at least one class that has no assigned class key. For example, in an implementation in which a security level dimension includes three classes, such as a first class denoting PII, a second class denoting company confidential information and a third class denoting publicly available information, the latter class need not have any class key. Numerous alternative dimensions each having one or more classes without any assigned class key are possible.

One or more of the dimensions 116 can each comprise a sequential arrangement of classes associated with respective hierarchically-arranged access levels such that an assigned class key for one of the classes corresponding to a particular access level permits readability of encrypted data items associated with that class as well as encrypted data items associated with classes corresponding to lower access levels.

The security level dimension comprising classes S1, S2, . . . S7 as described previously may be viewed as an example of a dimension that includes a linear arrangement of classes. This type of dimension makes it possible to render all data items at or above a designated class level unreadable.

In an arrangement of this type, the class key for the particular access level may be determined as a cryptographic hash of the class keys for the lower access levels, or as a sequential wrapping of the class keys for the lower access levels.

For example, a single class key can be stored for a highest one of the access levels, with class keys for the lower access levels being determined by repeated application of a cryptographic hash to the single class key.

It is further assumed in the FIG. 1 embodiment that a given data item encrypted for storage in general storage 112 of storage array 102 using a multidimensional key has corresponding metadata indicating at least a subset of the classes with which that data item is associated. The metadata for the given data item illustratively comprises the multidimensional key encrypted as a function of the class keys corresponding to respective ones of the classes with which that data item is associated.

For example, the multidimensional key may be encrypted using a cryptographic hash of the class keys corresponding to respective ones of the classes with which the given data item is associated.

As another example, the multidimensional key may be encrypted by sequentially wrapping the multidimensional key using the class keys corresponding to respective ones of the classes with which the given data item is associated.

The metadata for a given data item in some embodiments indicates the class or classes to which the data item belongs in each of the dimensions. It is possible, however, that at least one of the classes for the given data item may be inferred without being explicitly specified in the metadata for that data item. For example, a given customer may only store data on a certain storage drive in a given system implementation. As another example, data having a certain security level may only be stored on a certain storage drive.

In an embodiment in which encrypted data items are sent to a recipient, the encrypted data items and their associated metadata are sent, along with only those class keys that enable decryption of the particular encrypted data items that the recipient is authorized to read. As mentioned above, this may be viewed as a form of data redaction specifically tailored to a particular recipient.

Again, these are just examples, and numerous other multidimensional key configurations can be used in other embodiments.

Moreover, the configuration of the storage array 102 in terms of the number of dimensions and the number of classes per dimension can be configured to accommodate various system constraints.

Accordingly, it should be understood that a wide variety of dimension and class arrangements are possible. For example, the dimension and class arrangements need not be symmetric or uniform in any way.

As noted above, an advantage of the example multidimensional key configurations described above is that shredding or other deletion of one or more classes of data items can be easily and efficiently achieved through deletion of the corresponding class keys and therefore without requiring decryption and re-encryption of any encrypted stored data items in any other ones of the classes.

For example, as mentioned previously, the key manager 104 in the present embodiment is illustratively configured to delete a given class of data items from the general storage 112 by simply deleting the corresponding class key. The key manager 104 can then generate a replacement class key to replace the deleted class key.

In an arrangement of this type, the data items in all other non-deleted classes in the general storage 112 remain unchanged as a result of the deletion of the given class, and therefore the data items of any such non-deleted classes need not be "rolled over" through application of decryption and re-encryption operations. Such an arrangement in some embodiments can provide a considerable performance improvement relative to conventional arrangements in which all stored data items are potentially subject to decryption and re-encryption operations upon deletion of a single data item.

The storage array 102 in the storage system 100 can be implemented utilizing storage arrays such as VNX® and Symmetrix VMAX®, both commercially available from EMC Corporation of Hopkinton, Mass.

However, storage systems with controller key wrapping functionality as disclosed herein can be implemented using a wide variety of additional or alternative arrangements of storage devices. For example, a given storage system as the term is broadly utilized herein can comprise a plurality of scale-out network-attached storage (NAS) clusters. These NAS clusters may be implemented, for example, using Isilon® storage platforms, such as storage platforms comprising Isilon® platform nodes and associated accelerators in the S-Series, X-Series and NL-Series product lines, commercially available from EMC Corporation. Other storage products such as ViPR® Software-Defined Storage (SDS), ScaleIO™ and XtremIO™, all from EMC Corporation, can additionally or alternatively be used.

The key manager 104 in the storage system 100 illustratively comprises a key generator 120, an encryption module 122, a decryption module 124 and a key update controller 126. The key generator 120 more particularly comprises a class key generator 120A and a multidimensional key generator 120B utilized to generate respective class and multidimensional keys for use in encrypting data items for storage in the general storage 112. Additionally or alternatively, at least a subset of the class keys and the multidimensional keys can be supplied to the key manager from an external component of the storage system 100, although such a component is not explicitly shown in the figure. Other key generators may be included in a given embodiment, such as key generators for generating data encryption keys.

The encryption and decryption modules 122 and 124 are illustratively utilized to encrypt and decrypt data encryption keys using controller keys and possibly also class keys as described elsewhere herein. Such modules can be used to perform other types of encryption and decryption operations in other embodiments.

The input-output controller 105 also includes encryption and decryption modules 122' and 124' that are illustratively utilized to encrypt and decrypt data items in conjunction with storage in and retrieval from the general storage 112. Such encryption and decryption utilizes data encryption keys that are each included in metadata wrapped with at least the controller key and possibly one or more additional keys. The additional keys in some embodiments comprise respective class keys of the classes associated with a given data item.

The key update controller 126 illustratively controls updating of data encryption keys and controller keys. In addition, the key update controller 126 is used to update the class keys and multidimensional keys as needed in order to effect deletion of one or more selected classes of data items from the general storage 112.

It is to be appreciated that this particular arrangement of key manager and input-output controller modules illustrated in the FIG. 1 embodiment is presented by way of example only, and alternative arrangements can be used in other embodiments. For example, the functionality associated with the modules 120, 122, 122', 124, 124' and 126 in other embodiments can be combined into fewer modules, or separated across a larger number of modules.

The key manager 104 in the FIG. 1 embodiment is assumed to be implemented using at least one processing device. Each such processing device generally comprises at least one processor and an associated memory, and implements one or more functional modules for controlling certain features of the key manager 104.

More particularly, the key manager 104 in this embodiment comprises a processor 130 coupled to a memory 132 and a network interface 134.

The processor 130 illustratively comprises a microprocessor, a microcontroller, an application-specific integrated circuit (ASIC), a field-programmable gate array (FPGA) or other type of processing circuitry, as well as portions or combinations of such circuitry elements.

The memory 132 illustratively comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 134 allows the key manager 104 to communicate with the storage array 102 and possibly also with other system components not explicitly illustrated. For example, the key manager may be configured in some embodiments to communicate via network interface 134 with user devices and administrator terminals. The network interface 134 illustratively comprises one or more conventional transceivers.

At least portions of the key manager 104, such as portions of one or more of key generator 120, encryption module 122, decryption module 124 and key update controller 126, may be implemented at least in part in the form of software that is stored in memory 132 and executed by processor 130.

Similarly, portions of the input-output controller 105 may also be implemented at least in part in the form of software stored in memory and executed by a processor of a processing device. Accordingly, the input-output controller 105 can comprise one or more processing devices with processor, memory and network interface components similar to those described above in the context of the key manager 104.

Other implementations of an input-output controller are possible. For example, a distributed input-output controller having portions associated with respective storage drives of the storage array 102 may be used. Such portions may be used to implement self-encrypting functionality for respective ones of the storage drives.

It is to be understood that the particular set of elements shown in FIG. 1 for configuring a storage system and associated key manager and input-output controller is presented by way of illustrative example only, and in other embodiments additional or alternative elements may be used. Thus, another embodiment may include additional or alternative systems, devices and other entities, as well as different arrangements of modules and other components.

Communications between the various elements of storage system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the storage array 102, the key manager 104 and the input-output controller 105 may be implemented using one or more processing platforms. A given such processing platform includes at least one processing device comprising a processor coupled to a memory, and the one or more processing devices may be implemented at least in part utilizing one or more virtual machines or other types of virtualization infrastructure such as Linux containers (LXCs) in association with underlying physical hardware.

It is to be appreciated that a given embodiment of the storage system 100 may include multiple instances of the storage array 102, the key manager 104 and the input-output controller 105, although only a single instance of each of these elements is shown in the system diagram for clarity and simplicity of illustration.

Accordingly, the particular set of components implemented in the storage system 100 as illustrated in FIG. 1 is presented by way of example only. In other embodiments, alternative sets of components may be used, and such components may exhibit alternative functionality and configurations.

The operation of the storage system 100 will now be described in further detail with reference to the flow diagram of FIG. 2. The process as shown includes steps 200 through 206, and is suitable for use in the storage system 100 but is more generally applicable to other storage systems implementing functionality based on controller key wrapping of data encryption keys as disclosed herein.

In step 200, an input-output controller is configured to control storage of data items in a storage system. For example, in the context of the FIG. 1 embodiment, input-output controller 105 is illustratively coupled between key manager 104 and storage array 102 and configured to control reading and writing of encrypted data items in the general storage 112. The term "configured" in this context and other similar contexts herein is intended to be broadly construed, and should not be viewed as requiring actual operation of the storage system 100.

In step 202, a controller key accessible to the input-output controller is determined, as well as a plurality of data encryption keys utilizable by the input-output controller to encrypt the data items for storage in the storage system. The controller key is illustratively the controller key 115 stored in a highly secure manner in protected storage 110 by the input-output controller 105. The data encryption keys can be determined by the input-output controller 105 without requesting additional keys or other information from the key manager 104. For example, the input-output controller 105 can determine the data encryption keys for respective data items by unwrapping those keys using the controller key 115 and possibly one or more additional keys such as one or more class keys.

In step 204, a given one of the data items is encrypted for storage in the storage system using a particular one of the data encryption keys. The given one of the data items to be encrypted for storage in step 204 can be obtained from an entity external to the storage system 100. For example, an external user device or administrator terminal may provide a data item to the system 100 for storage in the general storage 112 of the storage array 102. As noted above, each data item can be encrypted using a unique data encryption key. Alternatively, data encryption keys can be used to encrypt respective groups or other arrangements of data items. Numerous other arrangements of data encryption keys can be used, and such data encryption keys can comprise, for example, master keys, multidimensional keys or other types of keys, as well as combinations of such keys.

In step 206, the encrypted data item is stored in the storage system in association with metadata that includes the particular data encryption key wrapped or otherwise encrypted using the controller key. For example, in the FIG. 1 embodiment, the metadata for the encrypted data item includes the data encryption key wrapped using at least a controller key 115 of the input-output controller 105.

As mentioned previously, the wrapping that uses the controller key may comprise an inner wrapping, with one or more outer wrappings being added to the inner wrapping using respective additional keys.

For example, in an embodiment utilizing multidimensional keys determined as a function of class keys, the additional keys used for respective ones of the outer wrappings may illustratively comprise respective ones of a plurality of class keys corresponding to respective ones of a plurality of classes with which the given data item is associated. Other types of multidimensional keys or more generally data encryption keys can be used in other embodiments.

Steps 204 and 206 are repeated for each of one or more additional data items so as to encrypt and store multiple data items using respective data encryption keys. In the context of the FIG. 1 embodiment, the encrypted data items are illustratively stored in the general storage 112 under the control of the input-output controller 105.

As noted above, in some implementations of the FIG. 2 process, it is assumed that the wrapped or unwrapped data encryption keys comprise respective multidimensional keys.

For example, as noted above, the dimensions may illustratively comprise one or more of storage drive, customer and security level. As mentioned previously, an arrangement with all three of these example dimensions may more particularly include j classes within the storage drive dimension, k classes within the customer dimension, and n classes within the security level dimension, such that there is a total of j+k+n class keys.

However, other embodiments can utilize different types and configurations of class keys and associated multidimensional keys. Also, as indicated previously, other embodiments need not utilize multidimensional keys.

In an embodiment utilizing multidimensional keys, each of the dimensions 116 in general storage 112 of the FIG. 1 embodiment illustratively includes multiple distinct ones of the classes 118. The key manager 104 assigns class keys to respective ones of the classes of each of the dimensions. At least a portion of the class keys are generated by the class key generator 120A under the control of the key update controller 126. One or more class keys can alternatively be provided to the key manager 104 from another system entity.

A given one of the data items associated with at least one of the classes in each of two or more of the dimensions is obtained. For example, an external user device or administrator terminal may provide a data item to the system 100 for storage in the general storage 112 of the storage array 102 in association with particular ones of a plurality of predetermined classes.

The given data item is encrypted for storage in the storage system using a multidimensional key determined as a function of the class keys corresponding to respective ones of the classes with which that data item is associated. For example, the multidimensional key is illustratively determined by the multidimensional key generator 120B as a function of multiple class keys obtained from the class key generator 120A. The resulting multidimensional key is then utilized by the encryption module 122 to encrypt the given data item for storage in the general storage 112. This process is repeated for each of one or more additional data items so as to encrypt multiple data items for each of the classes 118. The resulting encrypted data items are stored in encrypted form in the general storage 112.

All of the encrypted stored data items associated with a given one of the classes may be deleted by deleting the class key assigned to the given class. The selection of a given class of data items for deletion can be based on a variety of different factors. It should be noted in this regard that the term "deletion" is intended to be broadly construed, so as to encompass various arrangements for shredding a class of one or more data items or otherwise making the one or more data items of the class effectively unreadable. Such deletion in some embodiments is illustratively assumed to be irrevocable. Also, the term "deletion" as broadly used herein is intended to encompass modification of a class of one or more data items or other types of replacement of a class of one or more data items.

A replacement class key may be obtained to replace the deleted class key. The replacement class key is illustratively obtained from the key generator 120 under the control of the key update controller 126. Future data items associated with the deleted class can then be encrypted under new multidimensional keys that are generated based on the replacement class key and any other class keys associated with those data items.

As mentioned previously, illustrative multidimensional key embodiments such as that described above permit deletion of a class of stored encrypted data items without requiring decryption and re-encryption of any data items in any other classes. Accordingly, none of the other non-deleted classes of data items need to be "rolled over" in conjunction with the deletion of the selected class of data items. This provides considerable efficiencies in deletion of stored encrypted data items from the general storage 112, thereby improving overall performance of the storage system 100.

In alternative embodiments, one or more selected classes of data, instead of being deleted as described above, can be sent or otherwise provided from the storage system 100 to a recipient, along with one or more corresponding class keys that permit the recipient to decrypt the encrypted data items of the one or more classes.

Figure 2:
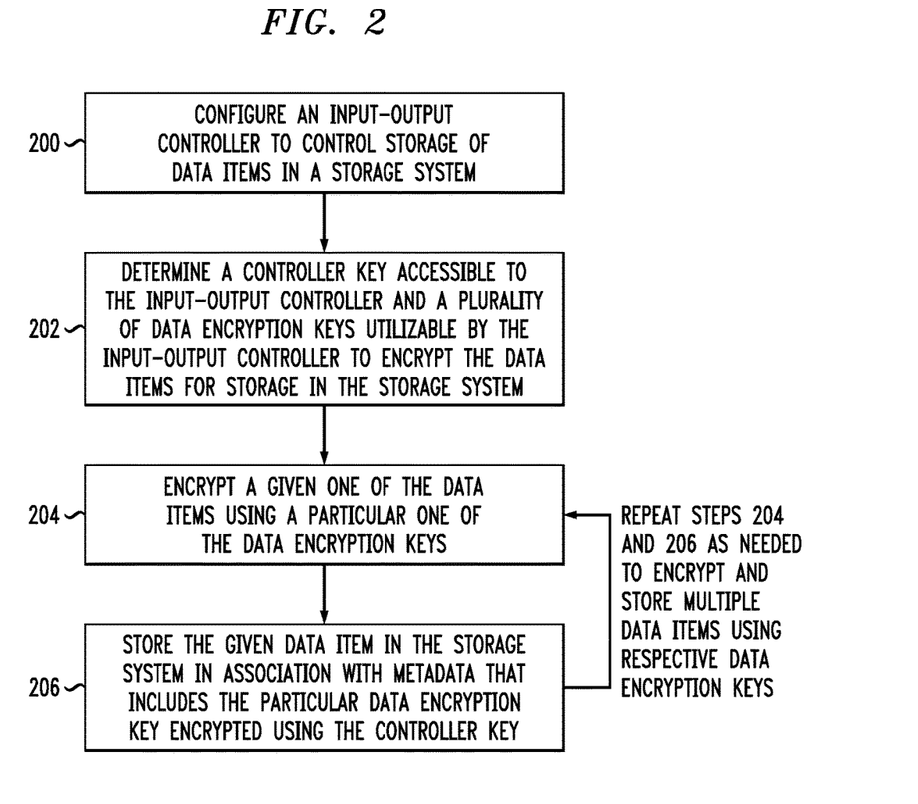
FIG. 2 is a flow diagram of an example process for encrypting and storing data items in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving controller key wrapping of data encryption keys. For example, the ordering of the process steps may be varied in other embodiments, or certain steps may be performed concurrently with one another rather than serially. As additional examples, one or more of the process steps may be repeated periodically for different processing instances, and multiple such processing instances can be performed in parallel with one another within a given storage system.

Also, functionality such as that described in conjunction with the flow diagram of FIG. 2 can be implemented at least in part in the form of one or more software programs stored in memory and executed by a processor of a processing device such as a computer or server. As mentioned previously, a storage device or other memory having executable program code of one or more software programs embodied therein is an example of what is more generally referred to herein as a "processor-readable storage medium."

The foregoing embodiments are therefore illustrative only, and should not be viewed as limiting the scope of any particular embodiment in any way. Those skilled in the art will appreciate that numerous alternative controller key wrapping arrangements can be used in other embodiments. For example, each dimension in a given embodiment utilizing multidimensional keys as respective wrapped or unwrapped data encryption keys can include different numbers and types of classes for categorization of data items.

Illustrative embodiments provide a number of significant advantages relative to conventional arrangements. For example, one or more such embodiments advantageously allow an input-output controller to read or write a data item in the storage system without requiring communication with the key manager, thereby reducing the latency associated with reading and writing of data items and improving system performance.

Furthermore, the security of the data encryption keys is improved within the storage system as the data encryption keys in one or more embodiments are not exposed in unencrypted form to any software components of the storage array. This advantageously avoids situations in which data encryption keys could be improperly disclosed through a compromised operating system or other issue relating to the storage array software.

Some embodiments can provide particularly efficient shredding of selected classes of encrypted stored data items using multidimensional keys determined based on class keys. This substantially reduces the number of stored encrypted data items that need to be "rolled over" in conjunction with deletion of selected data items.

In addition, the total number of class keys in some embodiments is bounded by the sum of the number of classes over the various dimensions. This ensures that the disclosed arrangements are scalable to potentially large numbers of dimensions each including multiple classes, without requiring excessive amounts of protected storage.

Some embodiments advantageously provide at least one dimension that includes a linear arrangement of classes, thereby facilitating functionality such as redaction of information when sending encrypted data items to particular recipients.

As indicated previously, components of a storage system as disclosed herein can be implemented at least in part in the form of one or more software programs stored in memory and executed by a processor of a processing device. For example, at least portions of the key manager 104 and input-output controller 105 and related functionality for controller key wrapping of data encryption keys for respective encrypted stored data items are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of storage systems and associated key managers and input-output controllers. Also, the particular features of the illustrative embodiments of FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage system;
a key manager associated with the storage system; and
an input-output controller coupled to the key manager and configured to control storage of data items in the storage system;
wherein the key manager is configured to determine a controller key accessible to the input-output controller and a plurality of data encryption keys utilizable by the input-output controller to encrypt the data items for storage in the storage system;
wherein a given one of the data items is encrypted using a particular one of the data encryption keys;
wherein the given data item has associated metadata that includes the particular data encryption key encrypted using the controller key;
wherein the input-output controller is configured to decrypt the given data item to perform a read or write of the given data item without communicating with the key manager thereby reducing read and write latency by:
obtaining the controller key from a local protected storage of the input-output controller;
reading the metadata associated with the given data item to identify the encrypted data encryption key;
decrypting the encrypted data encryption key utilizing the controller key;
decrypting the given data item utilizing the decrypted data encryption key; and
performing the read or write of the decrypted given data item;
wherein the key manager is implemented utilizing at least one processing device comprising a processor coupled to a memory;
wherein the metadata associated with the given data item comprises an inner wrapping of the particular data encryption key and at least two outer wrappings of the inner wrapping, with the inner wrapping using the controller key and the at least two outer wrappings using at least two additional keys corresponding to respective ones of at least two different classes with which the given data item is associated.

2. The apparatus of claim 1 wherein at least one of the key manager and the input-output controller is at least partially incorporated within the storage system.

3. The apparatus of claim 1 wherein the storage system comprises at least one storage array.

4. The apparatus of claim 3 wherein at least one of the key manager and the input-output controller is at least partially implemented within the storage array.

5. The apparatus of claim 1 wherein the storage system is configured to store the data items across a plurality of dimensions with each such dimension comprising a plurality of classes and wherein the key manager is configured to assign class keys to respective ones of the classes of each of the dimensions.

6. The apparatus of claim 5 wherein the dimensions comprise one or more of storage drive, customer and security level.

7. The apparatus of claim 5 wherein all data items associated with a given one of the classes are deleted by deleting the class key assigned to the given class.

8. An apparatus comprising:
a storage system;
a key manager associated with the storage system; and
an input-output controller coupled to the key manager and configured to control storage of data items in the storage system;
wherein the key manager is configured to determine a controller key accessible to the input-output controller and a plurality of data encryption keys utilizable by the input-output controller to encrypt the data items for storage in the storage system;
wherein a given one of the data items is encrypted using a particular one of the data encryption keys;
wherein the given data item has associated metadata that includes the particular data encryption key encrypted using the controller key;
wherein the input-output controller is configured to decrypt the given data item to perform a read or write of the given data item without communicating with the key manager thereby reducing read and write latency by:

obtaining the controller key from a local protected storage of the input-output controller;

reading the metadata associated with the given data item to identify the encrypted data encryption key;

decrypting the encrypted data encryption key utilizing the controller key;

decrypting the given data item utilizing the decrypted data encryption key; and performing the read or write of the decrypted given data item;

wherein the key manager is implemented utilizing at least one processing device comprising a processor coupled to a memory;

wherein the storage system is configured to store the data items across a plurality of dimensions with each such dimension comprising a plurality of classes and wherein the key manager is configured to assign class keys to respective ones of the classes of each of the dimensions; and wherein the given data item is associated with at least one of the classes in each of two or more of the dimensions and wherein the particular data encryption key used to encrypt the given data item comprises a multidimensional key determined as a function of the class keys corresponding to respective ones of the classes with which that data item is associated.

9. The apparatus of claim 8 wherein the multidimensional key used to encrypt the given data item comprises a cryptographic hash of the class keys corresponding to respective ones of the classes with which that data item is associated.

10. The apparatus of claim 8 wherein the metadata associated with the given data item indicates at least a subset of the classes with which that data item is associated.

11. The apparatus of claim 8 wherein the metadata associated with the given data item comprises the multidimensional key encrypted using the controller key in conjunction with the class keys corresponding to respective ones of the classes with which that data item is associated.

12. The apparatus of claim 1 wherein the at least two outer wrappings are formed by sequentially wrapping the inner wrapping using respective ones of at least two class keys corresponding to respective ones of the at least two different classes with which the given data item is associated.

13. The apparatus of claim 1 wherein the storage system comprises first storage of a first type and second storage of a second type with the first type of storage providing enhanced data protection relative to the second type of storage, the key manager being configured to maintain a key hierarchy for the storage system, the key hierarchy comprising a plurality of levels, wherein an uppermost level of the key hierarchy comprises the controller key that is stored in the first storage and wherein a lowermost level of the key hierarchy comprises at least a subset of the data encryption keys, each of the data encryption keys of the lowermost level of the key hierarchy being associated with a different group of the data items and being utilized to encrypt the data items of that group for storage in the second storage.

14. The apparatus of claim 1 wherein the key manager in cooperation with the input-output controller is configured to update the controller key by decrypting the data encryption key in the metadata of each data item using the controller key, deleting the controller key, obtaining a replacement controller key and re-encrypting the data encryption key in the metadata of each data item using the replacement controller key.

15. A method comprising:

configuring an input-output controller to control storage of data items in a storage system;

determining, using a key manager associated with the storage system, a controller key accessible to the input-output controller and a plurality of data encryption keys utilizable by the input-output controller to encrypt the data items for storage in the storage system;

encrypting a given one of the data items using a particular one of the data encryption keys; and storing the given data item in the storage system in association with metadata that includes the particular data encryption key encrypted using the controller key;

wherein the input-output controller is configured to decrypt the given data item to perform a read or write of the given data item without communicating with the key manager thereby reducing read and write latency by:

obtaining the controller key from a local protected storage of the input-output controller;

reading the metadata associated with the given data item to identify the encrypted data encryption key;

decrypting the encrypted data encryption key utilizing the controller key;

decrypting the given data item utilizing the decrypted data encryption key; and performing the read or write of the decrypted given data item;

wherein the configuring, determining, encrypting and storing are performed by at least one processing device comprising a processor coupled to a memory;

wherein the metadata associated with the given data item comprises an inner wrapping of the particular data encryption key and at least two outer wrappings of the inner wrapping, with the inner wrapping using the controller key and the at least two outer wrappings using at least two additional keys corresponding to respective ones of at least two different classes with which the given data item is associated.

16. A non-transitory processor-readable storage medium having stored therein program code of one or more software programs, wherein the program code when executed by at least one processing device causes said processing device:

to configure an input-output controller to control storage of data items in a storage system;

to determine, using a key manager associated with the storage system, a controller key accessible to the input-output controller and a plurality of data encryption keys utilizable by the input-output controller to encrypt the data items for storage in the storage system;

to encrypt a given one of the data items using a particular one of the data encryption keys; and to store the given data item in the storage system in association with metadata that includes the particular data encryption key encrypted using the controller key;

wherein the input-output controller is configured to decrypt the given data item to perform a read or write of the given data item without communicating with the key manager thereby reducing read and write latency by:

obtaining the controller key from a local protected storage of the input-output controller;

reading the metadata associated with the given data item to identify the encrypted data encryption key;

decrypting the encrypted data encryption key utilizing the controller key;

decrypting the given data item utilizing the decrypted data encryption key; and performing the read or write of the decrypted given data item;

wherein the metadata associated with the given data item comprises an inner wrapping of the particular data encryption key and at least two outer wrappings of the inner wrapping, with the inner wrapping using the controller key and the at least two outer wrappings using at least two additional keys corresponding to respective ones of at least two different classes with which the given data item is associated.

17. The apparatus of claim 1 wherein the local protected storage of the input-output controller provides enhanced data protection relative to a general storage of the storage system which stores the given data item.

18. The apparatus of claim 1 wherein the at least two different classes are associated with at least two different dimensions.

19. The apparatus of claim 18 wherein the at least two different dimensions comprise disjoint subsets of a plurality of classes including the at least two different classes.

20. The method of claim 15 wherein the at least two outer wrappings are formed by sequentially wrapping the inner wrapping using respective ones of at least two class keys corresponding to respective ones of the at least two different classes with which the given data item is associated.

21. The processor-readable storage medium of claim 16 wherein the at least two outer wrappings are formed by sequentially wrapping the inner wrapping using respective ones of at least two class keys corresponding to respective ones of the at least two different classes with which the given data item is associated.

* * * * *